US012704071B2

(12) United States Patent
Ghigliotty Rosado et al.

(10) Patent No.: US 12,704,071 B2
(45) Date of Patent: Aug. 11, 2026

(54) NOTCHED TURBINE VANE BAFFLE

(71) Applicant: RTX Corporation, Farmington, CT (US)

(72) Inventors: Jaime G. Ghigliotty Rosado, Cabo Rojo, OR (US); Russell J. Bergman, South Windsor, CT (US)

(73) Assignee: RTX Corporation, Farmington, CT (US)

( * ) Notice: Subject to any disclaimer, the term of this patent is extended or adjusted under 35 U.S.C. 154(b) by 71 days.

(21) Appl. No.: 18/766,197

(22) Filed: Jul. 8, 2024

(65) Prior Publication Data

US 2026/0009334 A1 Jan. 8, 2026

(51) Int. Cl.
*F01D 5/18* (2006.01)

(52) U.S. Cl.
CPC ........ *F01D 5/188* (2013.01); *F05D 2240/126* (2013.01); *F05D 2260/20* (2013.01)

(58) Field of Classification Search
CPC .......... F01D 5/188; F01D 5/187; F01D 5/186; F01D 5/147; F05D 2240/126; F05D 2260/20
See application file for complete search history.

(56) References Cited

U.S. PATENT DOCUMENTS 3,475,107 A * 10/1969 Auxier .................... F01D 5/189 415/115
4,297,077 A 10/1981 Durgin
6,200,087 B1 * 3/2001 Tung ....................... F01D 5/186 415/115
6,769,875 B2 8/2004 Tiemann
10,436,037 B2 10/2019 Jones
11,230,931 B1 * 1/2022 Dvorozniak ............ F01D 5/189
2003/0031555 A1 2/2003 Noe
2017/0030218 A1 * 2/2017 Papple .................... F01D 5/189

FOREIGN PATENT DOCUMENTS

FR 2943380 B1 4/2011

OTHER PUBLICATIONS

EP Search Report for EP Patent Application No. 25188091.0 dated Jan. 7, 2026.

* cited by examiner

*Primary Examiner* — Chelsea E Stinson
*Assistant Examiner* — Eric A Lange
(74) *Attorney, Agent, or Firm* — Getz Balich LLC

(57) ABSTRACT

An assembly for a turbine engine includes an airfoil and a baffle. A cavity projects spanwise into the airfoil from an airfoil tip end towards an airfoil base end. The baffle is disposed in the cavity with an outer passage formed between the baffle and a wall of the airfoil. The baffle extends spanwise from a baffle base end disposed at the airfoil base end to a baffle tip end disposed at the airfoil tip end. The baffle extends longitudinally from a baffle end to a baffle trailing edge. The baffle extends laterally between a baffle first side and a baffle second side. An inner passage projects spanwise into the baffle from the baffle tip end towards the baffle base end. A notch is disposed in the baffle trailing edge at the baffle base end. The notch fluidly couples the inner passage to the outer passage.

19 Claims, 11 Drawing Sheets

NOTCHED TURBINE VANE BAFFLE

BACKGROUND OF THE DISCLOSURE

1. Technical Field

This disclosure relates generally to a turbine engine and, more particularly, to a cooling a turbine vane structure within the turbine engine.

2. Background Information

A gas turbine engine typically includes an air cooled turbine vane structure along its flowpath. Various types and configurations of turbine vane structures are known in the art. While these known turbine vane structures have various benefits, there is still room in the art for improvement.

SUMMARY OF THE DISCLOSURE

According to an aspect of the present disclosure, an assembly is provided for a turbine engine. This assembly includes an airfoil and a baffle. The airfoil extends spanwise from an airfoil base end to an airfoil tip end. The airfoil extends longitudinally from an airfoil leading edge to an airfoil trailing edge. The airfoil extends laterally between an airfoil first side and an airfoil second side with the airfoil second side meeting the airfoil first side at the airfoil leading edge and the airfoil trailing edge. A cavity projects spanwise into the airfoil from the airfoil tip end towards the airfoil base end. The baffle is disposed in the cavity with an outer passage formed between the baffle and a wall of the airfoil. The baffle extends spanwise from a baffle base end disposed at the airfoil base end to a baffle tip end disposed at the airfoil tip end. The baffle extends longitudinally from a baffle end to a baffle trailing edge. The baffle extends laterally between a baffle first side and a baffle second side with the baffle second side meeting the baffle first side at the baffle trailing edge. An inner passage projects spanwise into the baffle from the baffle tip end towards the baffle base end. A notch is disposed in the baffle trailing edge at the baffle base end. The notch fluidly couples the inner passage to the outer passage.

According to another aspect of the present disclosure, another assembly is provided for a turbine engine. This assembly includes an airfoil and a baffle. The airfoil extends spanwise from an airfoil inner end to an airfoil outer end. The airfoil extends longitudinally from an airfoil leading edge to an airfoil trailing edge. The airfoil extends laterally between an airfoil first side and an airfoil second side with the airfoil second side meeting the airfoil first side at the airfoil leading edge and the airfoil trailing edge. A cavity projects spanwise into the airfoil from the airfoil outer end towards the airfoil inner end. The baffle is disposed in the cavity with an outer passage formed between the baffle and a wall of the airfoil. The baffle extends spanwise from a baffle outer end to a baffle inner end. The baffle extends longitudinally from a baffle end to a baffle trailing edge. The baffle extends laterally between a baffle first side and a baffle second side with the baffle second side meeting the baffle first side at the baffle trailing edge. An inner passage projects spanwise into the baffle from the baffle outer end towards the baffle inner end. One or more notches are formed along the baffle trailing edge. The one or more notches fluidly couple the inner passage to the outer passage. An outer portion of the baffle trailing edge spanwise between the one or more notches and the baffle outer end fluidly decouples the inner passage from the outer passage. A spanwise length of the outer portion of the baffle trailing edge is equal to or greater than one-half of a spanwise length of the baffle trailing edge from the baffle inner end to the baffle outer end.

According to still another aspect of the present disclosure, an apparatus is provided for a turbine vane in a turbine engine. This apparatus includes a baffle. The baffle includes sheet metal and a plurality of notches. The sheet metal forms the baffle with an endwall, a first sidewall, a second sidewall and an internal passage. The endwall, the first sidewall and the second sidewall each extend spanwise from an inner end of the baffle to an outer end of the baffle. The endwall extends laterally between the first sidewall and the second sidewall. The first sidewall and the second sidewall project longitudinally out from the endwall and meet at a trailing edge of the baffle. The internal passage extends spanwise through the baffle. The internal passage extends longitudinally within the baffle from the endwall to an intersection between the first sidewall and the second sidewall at the trailing edge of the baffle. The internal passage extends laterally within the baffle from the first sidewall to the second sidewall. The notches are disposed in and arranged spanwise along the trailing edge of the baffle. Each of the notches projects laterally through and longitudinally into at least one of the first sidewall and the second sidewall. An outer portion of the trailing edge of the baffle spanwise between the notches and the outer end of the baffle is unperforated. A spanwise length of the outer portion of the trailing edge of the baffle is equal to or greater than one-half of a spanwise length of the trailing edge of the baffle from the inner end of the baffle to the outer end of the baffle.

The notch may have a spanwise length and a longitudinal depth. A ratio between the spanwise length and the longitudinal depth may be equal to or less than 1.5 to 1.

The notch may have a spanwise length and a longitudinal depth. A ratio between the spanwise length and the longitudinal depth may be greater than 1.5 to 1.

The baffle may include a baffle first sidewall and a baffle second sidewall that meets the baffle first sidewall at the baffle trailing edge. The baffle first sidewall may form the baffle first side. The baffle second sidewall may form the baffle second side. The notch may extend laterally through and longitudinally into the baffle first sidewall.

The notch may also extend laterally through and longitudinally into the baffle second sidewall.

A portion of the baffle second sidewall may spanwise and longitudinally overlap the notch.

The airfoil first side may be a pressure side of the airfoil. The baffle first side may be disposed laterally between the baffle second side and the airfoil first side. The airfoil second side may be a suction side of the airfoil. The baffle second side may be disposed laterally between the baffle first side and the airfoil second side.

The airfoil first side may be a suction side of the airfoil. The baffle first side may be disposed laterally between the baffle second side and the airfoil first side. The airfoil second side may be a pressure side of the airfoil. The baffle second side may be disposed laterally between the baffle first side and the airfoil second side.

The notch may be one of a plurality of notches disposed in the baffle trailing edge.

The notches may provide a sole fluid coupling between the inner passage and the outer passage along the baffle.

The baffle trailing edge may include a perforated portion and an unperforated portion spanwise between the baffle tip end and the perforated portion. The notch may be disposed spanwise along the perforated portion. A spanwise length of the unperforated portion may be equal to or greater than one-half of a spanwise length of the baffle trailing edge from the baffle base end to the baffle tip end.

The outer passage may extend spanwise along the baffle trailing edge, the baffle first side and the baffle second side from the baffle tip end to the baffle base end.

The airfoil may include a trailing edge cooling circuit with a plurality of inlets and a plurality of outlets. The inlets may project through the wall of the airfoil and may be fluidly coupled to the outer passage. The outlets may be disposed spanwise along the airfoil trailing edge and may be fluidly coupled to an environment outside of the airfoil.

The trailing edge cooling circuit may also include a circuit cavity longitudinally between and fluidly coupled to the inlets and the outlets.

A plurality of protrusions may project laterally across the circuit cavity between a first sidewall of the airfoil and a second sidewall of the airfoil. The first sidewall of the airfoil may form the airfoil first side. The second sidewall of the airfoil may form the airfoil second side.

The wall of the airfoil may be a sidewall of the airfoil forming the airfoil first side or the airfoil second side. The airfoil may include one or more protrusions projecting laterally into the outer passage from the sidewall of the airfoil towards the baffle. Each of the one or more protrusions may be laterally spaced from the baffle.

The assembly may also include a turbine vane structure including the airfoil and the baffle.

The assembly may also include an inner platform, an outer platform and a plurality of vanes arranged circumferentially around the centerline in an array. The inner platform may extend circumferentially around a centerline. The outer platform may extend circumferentially around the centerline. Each of the vanes may extend spanwise from the inner platform to the outer platform. A first of the vanes may include the airfoil.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
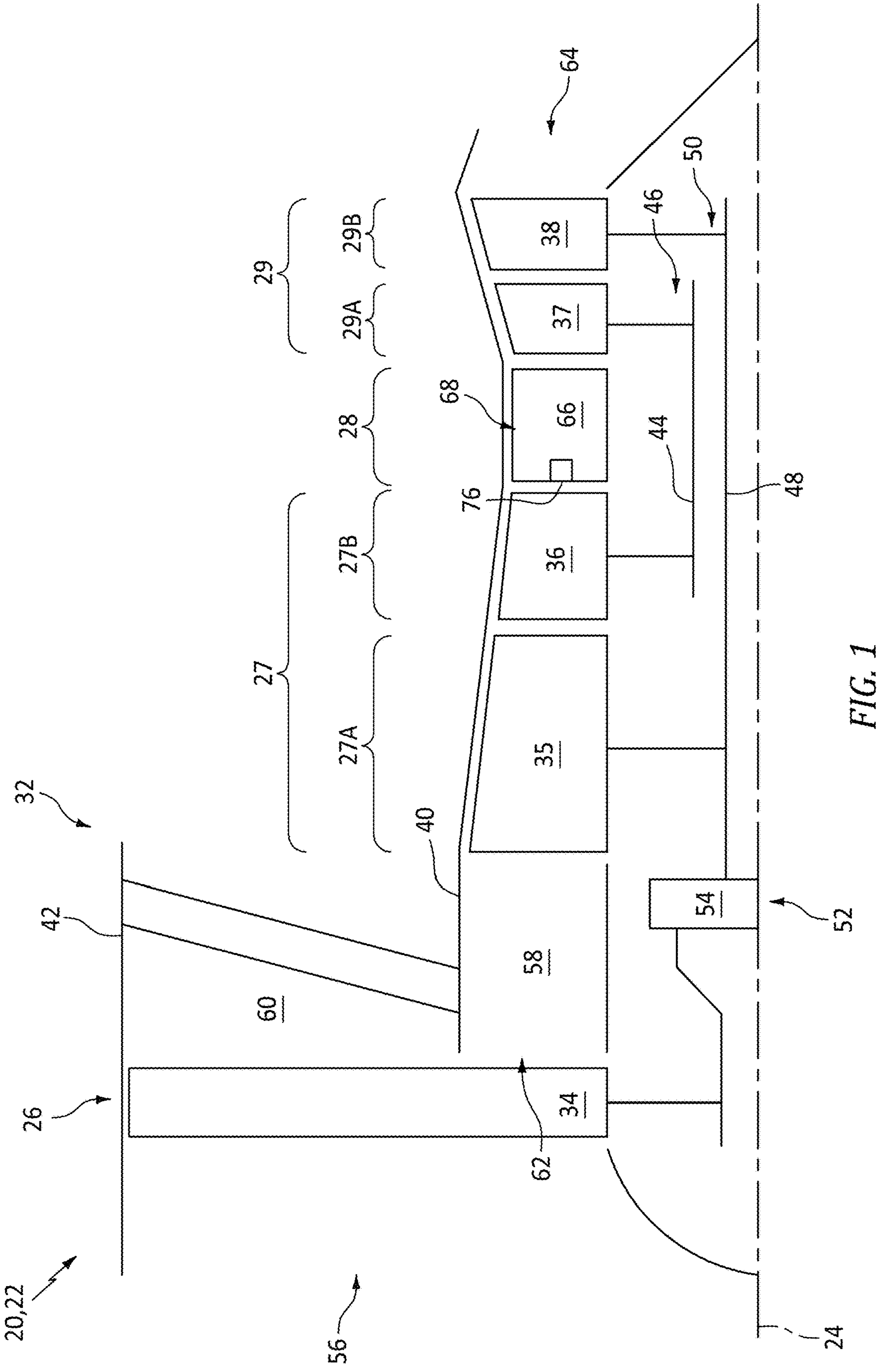
FIG. 1 is a partial side schematic illustration of an aircraft powerplant.

FIG. 1 illustrates a powerplant 20 of a propulsion system for an aircraft. The aircraft may be an airplane, a drone (e.g., an unmanned aerial vehicle (UAV)), or any other manned or unmanned aerial vehicle or system. For ease of description, the aircraft propulsion system is described below as a ducted rotor propulsion system such as a turbofan propulsion system, and the aircraft powerplant 20 is described below as a gas turbine engine 22 such as a turbofan engine. The present disclosure, however, is not limited to such an exemplary aircraft propulsion system. The aircraft propulsion system, for example, may alternatively be configured as a turbojet propulsion system, a turboprop propulsion system or an open rotor propulsion system. Moreover, the present disclosure is not limited to propulsion system applications. The turbine engine 22, for example, may alternatively be configured as or included as part of an auxiliary power unit (APU) for the aircraft or a ground-based (e.g., industrial) electrical power system.

The turbine engine 22 of FIG. 1 extends axially along an axis 24 between a forward, upstream end of the turbine engine 22 and an aft, downstream end of the turbine engine 22. Briefly, the axis 24 may be a centerline axis of the turbine engine 22 and/or one or more of its members. The axis 24 may also or alternatively be a rotational axis for one or more members of the turbine engine 22. The turbine engine 22 of FIG. 1 includes a propulsor section 26 (e.g., a fan section), a compressor section 27, a combustor section 28 and a turbine section 29. The compressor section 27 includes a low pressure compressor (LPC) section 27A and a high pressure compressor (HPC) section 27B. The turbine section 29 includes a high pressure turbine (HPT) section 29A and a low pressure turbine (LPT) section 29B.

The engine sections 26-29B may be arranged sequentially along the axis 24 within a stationary engine housing 32. The propulsor section 26 includes a bladed propulsor rotor 34; e.g., a fan rotor. The LPC section 27A includes a bladed low pressure compressor (LPC) rotor 35. The HPC section 27B includes a bladed high pressure compressor (HPC) rotor 36. The HPT section 29A includes a bladed high pressure turbine (HPT) rotor 37. The LPT section 29B includes a bladed low pressure turbine (LPT) rotor 38. These engine rotors 34-38 are housed within the engine housing 32. The engine housing 32 of FIG. 1, for example, includes an inner housing structure 40 (e.g., a core case structure) and an outer housing structure 42 (e.g., a propulsor case structure). The inner housing structure 40 may house one or more of the engine sections 27A-29B and their engine rotors 35-38. The outer housing structure 42 may house at least the propulsor section 26 and its propulsor rotor 34.

The HPC rotor 36 is coupled to and rotatable with the HPT rotor 37. The HPC rotor 36 of FIG. 1, for example, is connected to the HPT rotor 37 through a high speed shaft 44. At least (or only) the HPC rotor 36, the HPT rotor 37 and the high speed shaft 44 collectively form a high speed rotating assembly 46; e.g., a high speed spool of a core of the turbine engine 22. This high speed rotating assembly 46 of FIG. 1 and its members are rotatable about the axis 24.

The LPC rotor 35 is coupled to and rotatable with the LPT rotor 38. The LPC rotor 35 of FIG. 1, for example, is connected to the LPT rotor 38 through a low speed shaft 48. At least (or only) the LPC rotor 35, the LPT rotor 38 and the low speed shaft 48 collectively form a low speed rotating assembly 50; e.g., a low speed spool of the engine core. This low speed rotating assembly 50 is further coupled to the propulsor rotor 34 through a drivetrain 52. This drivetrain 52 may be configured as a geared drivetrain, where a geartrain 54 (e.g., a transmission, a speed change device, an epicyclic geartrain, etc.) is disposed between and operatively couples the propulsor rotor 34 to the low speed rotating assembly 50 and its LPT rotor 38. With this arrangement, the propulsor rotor 34 may rotate at a different (e.g., slower) rotational velocity than the low speed rotating assembly 50 and its LPT rotor 38. However, the drivetrain 52 may alternatively be configured as a direct drive drivetrain, where the geartrain 54 is omitted. With such an arrangement, the propulsor rotor 34 rotates at a common (the same) rotational velocity as the low speed rotating assembly 50 and its LPT rotor 38. The low speed rotating assembly 50 of FIG. 1 and its members as well as the propulsor rotor 34 are rotatable about the axis 24.

During operation, ambient air from outside of the aircraft enters the turbine engine 22 through an airflow inlet 56. This air is directed across the propulsor section 26 and into a (e.g., annular) core flowpath 58 and a (e.g., annular) bypass flowpath 60. The core flowpath 58 of FIG. 1 extends sequentially through the LPC section 27A, the HPC section 27B, the combustor section 28, the HPT section 29A and the LPT section 29B from an airflow inlet 62 into the core flowpath 58 to a combustion products exhaust 64 out from the core flowpath 58 and the engine core. The air entering the core flowpath 58 may be referred to as "core air". The air within the core flowpath 58 may be referred to as "core air". The bypass flowpath 60 extends through a bypass duct, which bypasses (e.g., is disposed radially outboard of and extends along) the engine core. The air within the bypass flowpath 60 may be referred to as "bypass air".

The core air is compressed by the LPC rotor 35 and the HPC rotor 36 and is directed into a (e.g., annular) combustion chamber 66 of a (e.g., annular) combustor 68 in the combustor section 28. Fuel is injected into the combustion chamber 66 by one or more fuel injectors 70 and mixed with the compressed core air to provide a fuel-air mixture. This fuel-air mixture is ignited and combustion products thereof flow through and sequentially drive rotation of the HPT rotor 37 and the LPT rotor 38 about the axis 24. The rotation of the HPT rotor 37 and the LPT rotor 38 respectively drive rotation of the HPC rotor 36 and the LPC rotor 35 about the axis 24 and, thus, compression of the air received from the core inlet 62. The rotation of the LPT rotor 38 also drives rotation of the propulsor rotor 34. The rotation of the propulsor rotor 34 propels the bypass air through and out of the bypass flowpath 60. The propulsion of the bypass air may account for a majority of thrust generated by the turbine engine 22 of FIG. 1, e.g., more than seventy-five percent (75%) of engine thrust. The turbine engine 22 of the present disclosure, however, is not limited to the foregoing exemplary thrust ratio.

Figure 2:
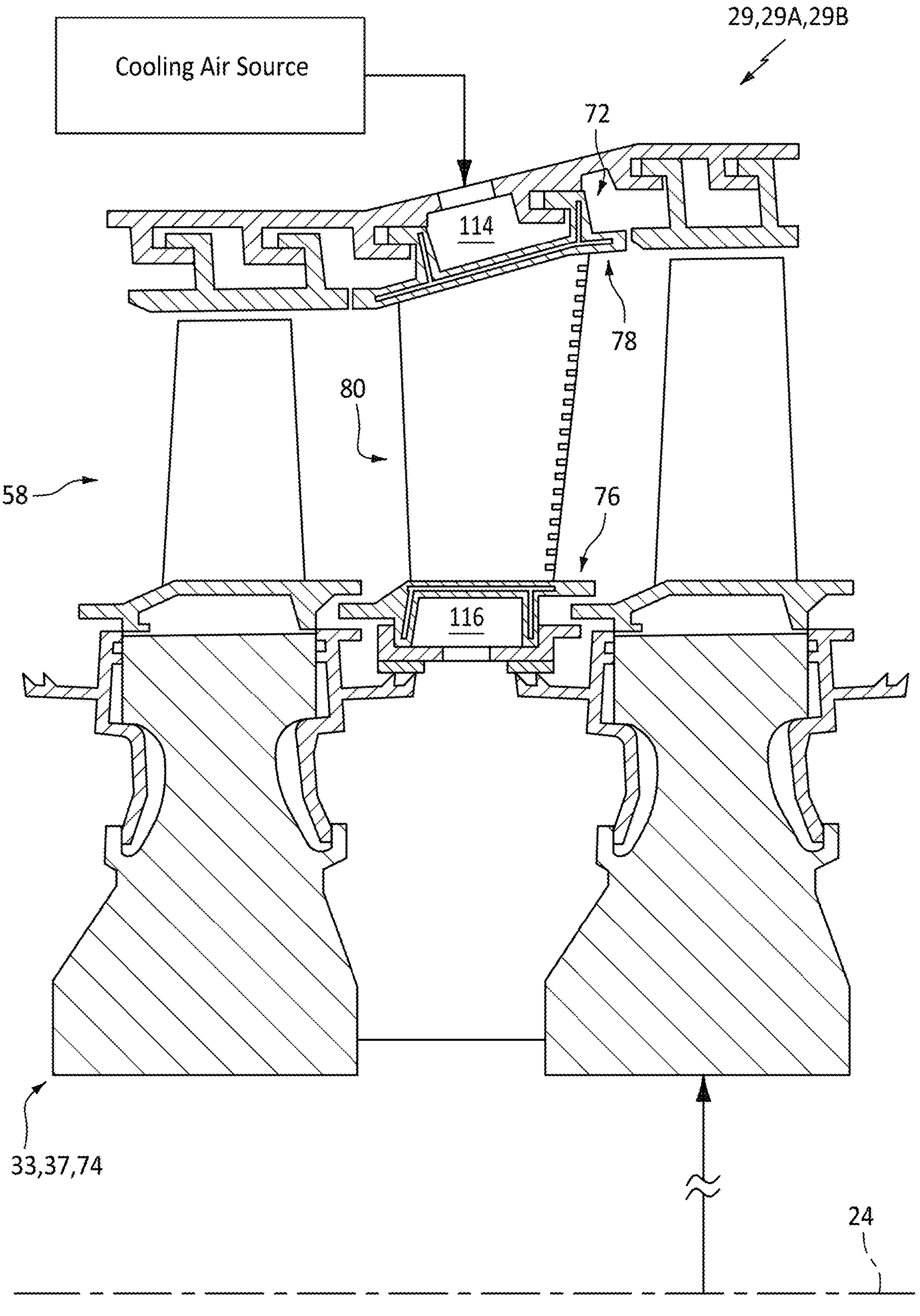
FIG. 2 is a partial side sectional illustration of a turbine section in the aircraft powerplant.

FIG. 2 illustrates an air-cooled turbine vane structure 72 (e.g., a turbine vane array) for the turbine section 29. This turbine vane structure 72 may be arranged at various locations along the core flowpath 58 within the turbine section 29. The turbine vane structure 72 of FIG. 2, for example, is arranged between a set of adjacent stages of a turbine rotor 74 along the core flowpath 58. With this arrangement, the turbine vane structure 72 may be disposed in the HPT section 29A of FIG. 1 and the turbine rotor 74 may be the HPT rotor 37. Alternatively, the turbine vane structure 72 may be disposed in the LPT section 29B of FIG. 1 and the turbine rotor 74 may be the LPT rotor 38. The turbine vane structure 72 of the present disclosure, however, is not limited to such exemplary arrangements. The turbine vane structure 72 of FIG. 2 includes a radial inner platform 76, a radial outer platform 78 and a plurality of stationary turbine vanes 80.

Figure 3:
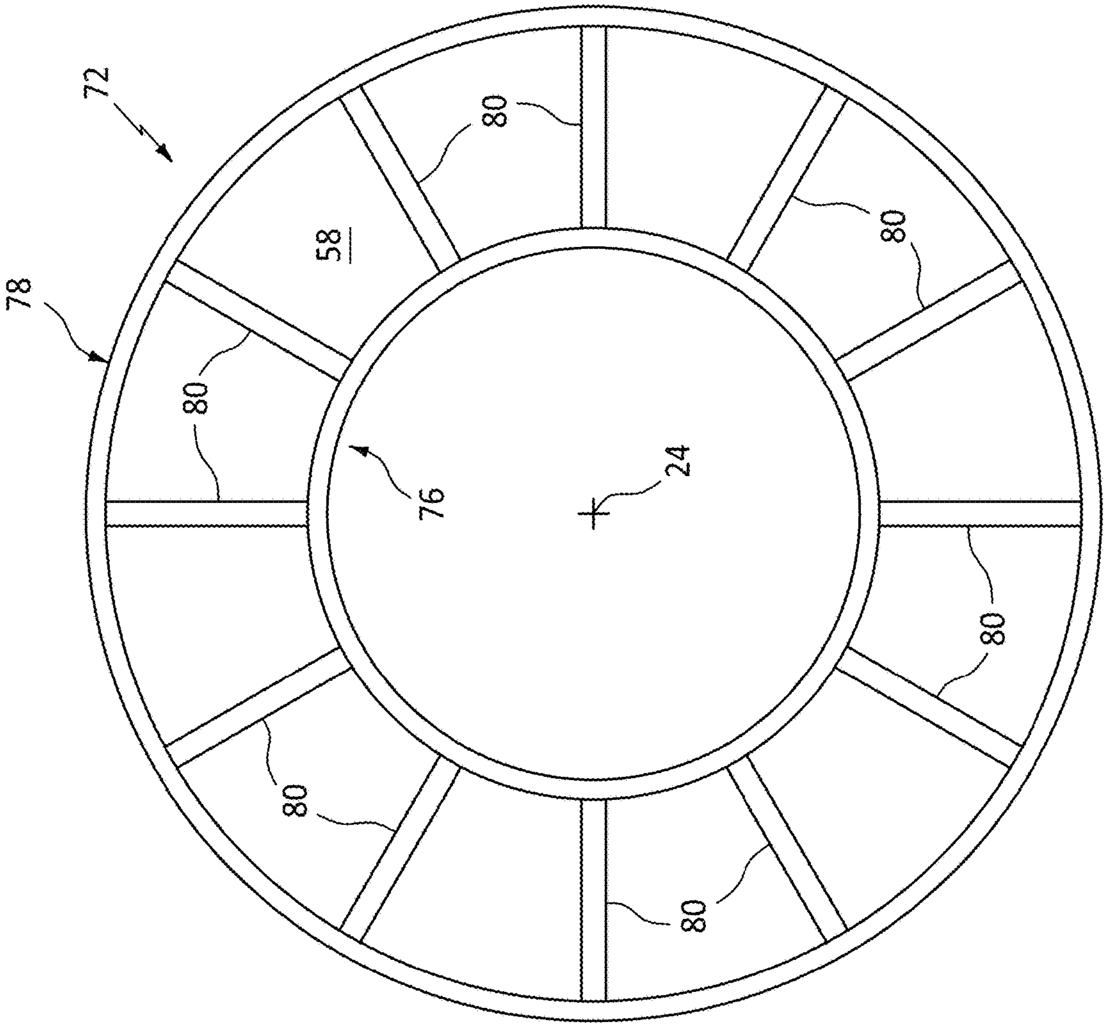
FIG. 3 is an end view schematic illustration of a turbine vane structure.

The inner platform 76 extends axially along the axis 24 from an upstream end of the inner platform 76 to a downstream end of the inner platform 76. The inner platform 76 extends radially from a radial inner side of the inner platform 76 to a radial outer side of the inner platform 76. Referring to FIG. 3, the inner platform 76 extends circumferentially about (e.g., completely around) the axis 24, providing the inner platform 76 with a full-hoop (e.g., tubular) geometry. At the inner platform outer side of FIG. 2, the inner platform 76 forms a radial inner peripheral boundary of a longitudinal section of the core flowpath 58 which extends through the turbine vane structure 72.

The outer platform 78 is disposed radially outboard of the inner platform 76. The outer platform 78 extends axially along the axis 24 from an upstream end of the outer platform 78 to a downstream end of the outer platform 78. The outer platform 78 extends radially from a radial inner side of the outer platform 78 to a radial outer side of the outer platform 78. Referring to FIG. 3, the outer platform 78 extends circumferentially about (e.g., completely around) the axis 24, providing the outer platform 78 with a full-hoop (e.g., tubular) geometry. At the outer platform inner side of FIG. 2, the outer platform 78 forms a radial outer peripheral boundary of the longitudinal section of the core flowpath 58 which extends through the turbine vane structure 72.

Figure 4:
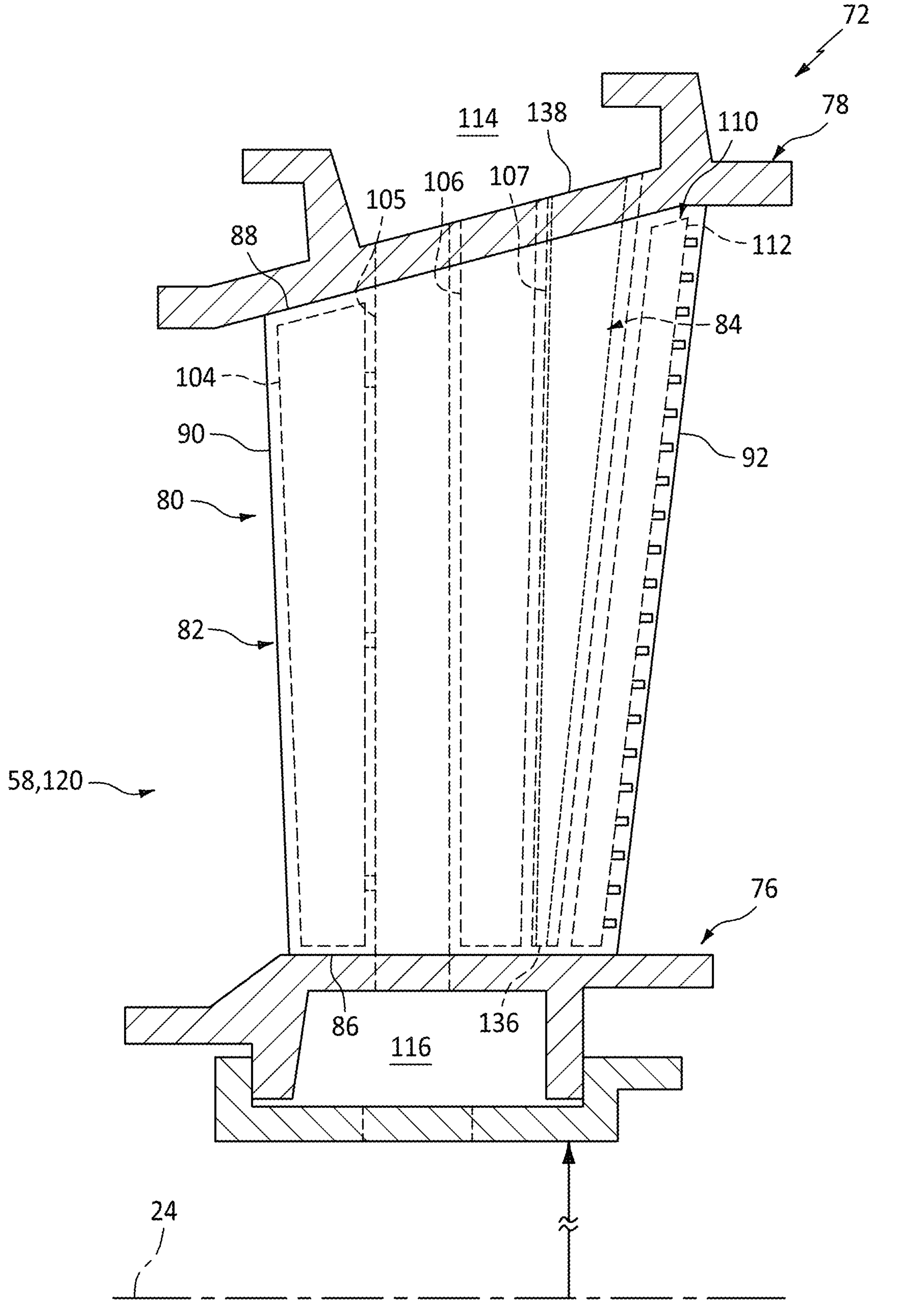
FIG. 4 is a partial side sectional illustration of the turbine vane structure.
Figure 5:
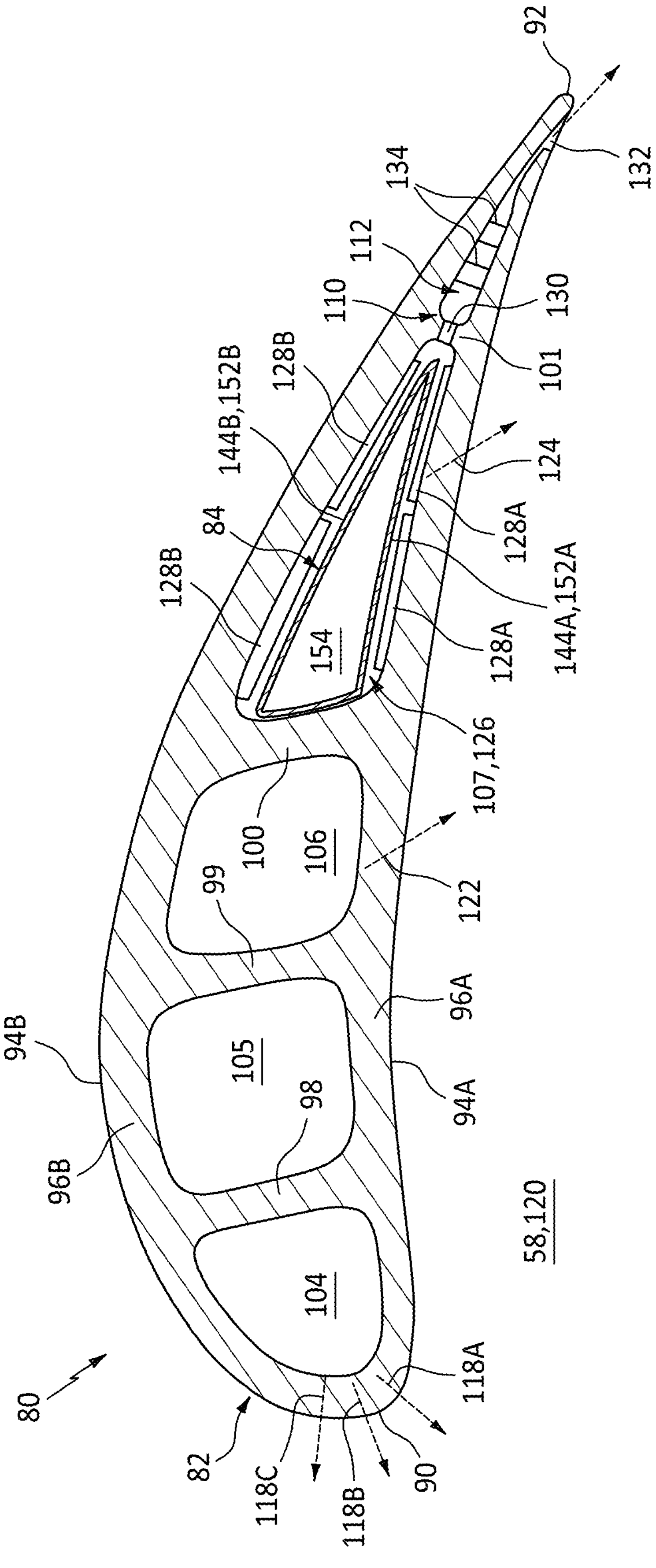
FIG. 5 is a sectional illustration of a turbine vane with a vane airfoil and a vane baffle.

Referring to FIG. 3, the turbine vanes 80 are arranged and may be equispaced circumferentially about the axis 24 in an annular vane array. This vane array and its turbine vanes 80 are disposed radially between the inner platform 76 and the outer platform 78. Referring to FIGS. 4 and 5, each of the turbine vanes 80 includes a turbine vane airfoil 82 arranged with a respective internal baffle 84.

Referring to FIG. 4, the vane airfoil 82 extends spanwise (e.g., radially relative to the axis 24) from a radial inner, base end 86 of the vane airfoil 82 to a radial outer, tip end 88 of the vane airfoil 82. The airfoil base end 86 of FIG. 4 is disposed radially adjacent the inner platform 76, and the vane airfoil 82 may be connected to the inner platform 76 at (e.g., on, adjacent or proximate) the airfoil base end 86. The airfoil tip end 88 of FIG. 4 is disposed radially adjacent the outer platform 78, and the vane airfoil 82 may be connected to the outer platform 78 at the airfoil tip end 88. The vane airfoil 82 extends longitudinally (e.g., generally axially along the axis 24) from a leading edge 90 of the vane airfoil 82 to a trailing edge 92 of the vane airfoil 82, where the airfoil leading edge 90 is upstream of the airfoil trailing edge 92 along the core flowpath 58. Referring to FIG. 5, the vane airfoil 82 extends laterally (e.g., generally circumferentially about the axis, or tangentially) between and to opposing lateral sides 94A and 94B (generally referred to as "94") of the vane airfoil 82. The airfoil first side 94A of FIG. 5 is a concave, pressure side of the vane airfoil 82. The airfoil second side 94B of FIG. 5 is a convex, suction side of the vane airfoil 82. The opposing airfoil sides 94 extend longitudinally to and meet at the airfoil leading edge 90 and the airfoil trailing edge 92. Referring to FIGS. 4 and 5, each of the airfoil members 90, 92, 94A, 94B extends spanwise from the airfoil base end 86/the inner platform 76 to the airfoil tip end 88/the outer platform 78.

Referring to FIG. 5, the vane airfoil 82 includes a first (e.g., concave, pressure) sidewall 96A, a second (e.g., convex, suction) sidewall 96B and one or more interior walls 98-101; e.g., ribs, dividers, etc. With this arrangement, the vane airfoil 82 is configured with one or more interior volumes; e.g., cavities and/or passages. More particularly, the vane airfoil 82 of FIG. 5 is configured with a leading edge feed passage 104, one or more intermediate feed passages 105 and 106 and a trailing edge feed cavity 107.

The vane airfoil 82 of FIG. 5 also includes a trailing edge cooling circuit 110 with a circuit cavity 112.

The airfoil first sidewall 96A forms the airfoil first side 94A. The airfoil second sidewall 96B forms the airfoil second side 94B. These airfoil sidewalls 96A and 96B (generally referred to as "96") extend longitudinally to and meet at the airfoil leading edge 90 and the airfoil trailing edge 92. The interior walls 98-101 are arranged and spaced apart longitudinally between the airfoil leading edge 90 and the airfoil trailing edge 92. Each of these interior walls 98-101 extends laterally between and is connected to the airfoil first sidewall 96A and the airfoil second sidewall 96B. The interior walls 98-101 thereby divide an interior of the vane airfoil 82 of FIG. 5 into the interior volumes 104-107 and 112.

Each of the interior volumes 104-107 and 112 may extend laterally within the vane airfoil 82 between and to the airfoil first sidewall 96A and the airfoil second sidewall 96B. The leading edge feed passage 104 extends longitudinally within the vane airfoil 82 from an upstream intersection between the airfoil sidewalls 96 at the airfoil leading edge 90 to the leading edge interior wall 98 (e.g., the interior wall longitudinally closest to the airfoil leading edge 90). The first intermediate feed passage 105 extends longitudinally within the vane airfoil 82 from the leading edge interior wall 98 to the first intermediate interior wall 99. The second intermediate feed passage 106 extends longitudinally within the vane airfoil 82 from the first intermediate interior wall 99 to the second intermediate interior wall 100. The trailing edge feed cavity 107 extends longitudinally within the vane airfoil 82 from the second intermediate interior wall 100 to the trailing edge interior wall 101 (e.g., the interior wall longitudinally closest to the airfoil trailing edge 92). The circuit cavity 112 extends longitudinally within the vane airfoil 82 from the trailing edge interior wall 101 to a downstream intersection between the airfoil sidewalls 96 at the airfoil trailing edge 92.

Referring to FIG. 4, each of the interior volumes 104-107 and 112 extends spanwise in the vane airfoil 82 from (or about) the airfoil tip end 88 to (or about) the airfoil base end 86. Each of the interior volumes 105-107, for example, may project spanwise into the vane airfoil 82 from the airfoil tip end 88 to a distal end at (or near) the airfoil base end 86. Each of the interior volumes 105-107 may also project radially through the outer platform 78 so as to be fluidly coupled with an outer plenum 114 radially adjacent and outboard of the outer platform 78. In addition, one or more of the interior volumes (e.g., the first intermediate feed passage 105) may also be fluidly coupled with an inner plenum 116 through one or more ports in the inner platform 76, which inner plenum 116 may be radially adjacent and inboard of the inner platform 76. Alternatively, one or more of the interior volumes (e.g., the first intermediate feed passage 105) may project radially through the inner platform 76 to the inner plenum 116. The trailing edge feed cavity 107 of FIG. 4, by contrast, is fluidly separated and decoupled from the inner plenum 116 by the inner platform 76. In addition, the circuit cavity 112 of FIG. 4 extends spanwise within (e.g., not into or through) the vane airfoil 82. This circuit cavity 112 is thereby fluidly separated and decoupled from the outer plenum 114 by the outer platform 78. The circuit cavity 112 is also fluidly separated and decoupled from the inner plenum 116 by the inner platform 76.

Referring to FIG. 5, the leading edge feed passage 104 may be arranged with one or more spanwise extending arrays of cooling apertures 118A-C (generally referred to as "118") at the airfoil leading edge 90. Each of these cooling apertures 118 projects through a respective sidewall 96 of the vane airfoil 82 from the leading edge feed passage 104 to an environment 120 external to the vane airfoil 82—the core flowpath 58. Each of the cooling apertures 118 thereby fluidly couples the leading edge feed passage 104 to the external environment 120/the core flowpath 58.

The second intermediate feed passage 106 may be arranged with at least one spanwise extending array of cooling apertures 122 along the airfoil first side 94A. Each of these cooling apertures 122 projects through the airfoil first sidewall 96A from the second intermediate feed passage 106 to the external environment 120/the core flowpath 58. Each of the cooling apertures 122 thereby fluidly couples the second intermediate feed passage 106 to the external environment 120/the core flowpath 58.

The trailing edge feed cavity 107 may be arranged with at least one spanwise extending array of cooling apertures 124 along the airfoil first side 94A. More particularly, a trailing edge feed passage 126 formed by and between the walls 96A, 96B and 101 of the vane airfoil 82 and the vane baffle 84 may be arranged with the cooling apertures 124 along the airfoil first side 94A. Each of these cooling apertures 124 projects through the airfoil first sidewall 96A from the trailing edge feed cavity 107/the trailing edge feed passage 126 to the external environment 120/the core flowpath 58. Each of the cooling apertures 124 thereby fluidly couples the trailing edge feed cavity 107/the trailing edge feed passage 126 to the external environment 120/the core flowpath 58.

Figure 6:
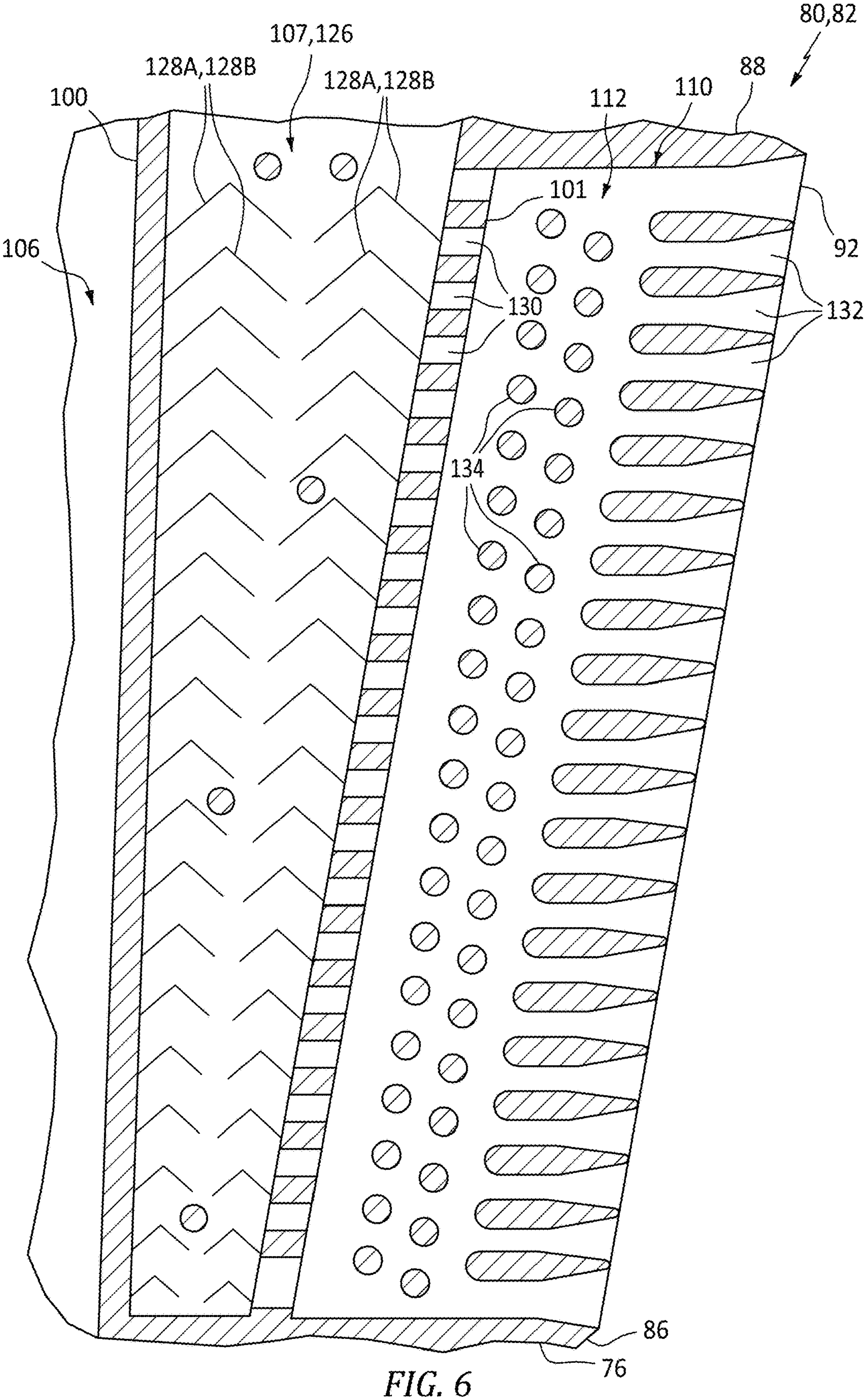
FIG. 6 is a partial cutaway illustration of the vane airfoil.

The trailing edge feed cavity 107/the trailing edge feed passage 126 may also or alternatively be arranged with one or more sets of protrusions 128A and 128B (generally referred to as "128"); e.g., trip strips, cooling elements, turbulators, etc. The first side protrusions 128A are connected to the airfoil first sidewall 96A, where each of the first side protrusions 128A project laterally out from the airfoil first sidewall 96A (e.g., partially) into the trailing edge feed passage 126. The second side protrusions 128B are connected to the airfoil second sidewall 96B, where each of the second side protrusions 128B project laterally out from the airfoil second sidewall 96B (e.g., partially) into the trailing edge feed passage 126. Referring to FIG. 6, each set of the protrusions 128 may be arranged into one or more spanwise extending arrays between the airfoil base end 86 and the airfoil tip end 88.

The trailing edge cooling circuit 110 of FIG. 6 includes the circuit cavity 112, one or more circuit inlets 130 and one or more circuit outlets 132 (e.g., cooling apertures). The circuit inlets 130 are arranged and may (or may not) be equispaced spanwise along the trailing edge interior wall 101. Each of these circuit inlets 130 may be a port which projects longitudinally through the trailing edge interior wall 101 from the circuit cavity 112 to the trailing edge feed cavity 107/the trailing edge feed passage 126. The circuit inlets 130 thereby fluidly couple the trailing edge feed passage 126 to the circuit cavity 112. The circuit outlets 132 are arranged at, along and may (or may not) be equispaced spanwise along the airfoil trailing edge 92. Referring to FIG. 5, each of the circuit outlets 132 may be a port projects through a respective sidewall 96 (e.g., 96A) of the vane airfoil 82 from the circuit cavity 112 to the external environment 120/the core flowpath 58. Each circuit outlet 132 of FIG. 5 is disposed in the airfoil first side 94A, longitudinally adjacent the airfoil trailing edge 92. It is contemplated, however, one or more of the circuit outlets 132 may alternatively be disposed in the airfoil trailing edge 92.

Referring to FIG. 6, the trailing edge cooling circuit 110 may also be arranged with one or more protrusions 134; e.g., columns, cooling elements, turbulators, etc. These circuit protrusions 134 may be arranged into one or more spanwise extending arrays. Referring to FIG. 5, each of the circuit protrusions 134 extends laterally across the circuit cavity 112 between and may be connected to the airfoil first sidewall 96A and/or the airfoil second sidewall 96B.

Figure 7:
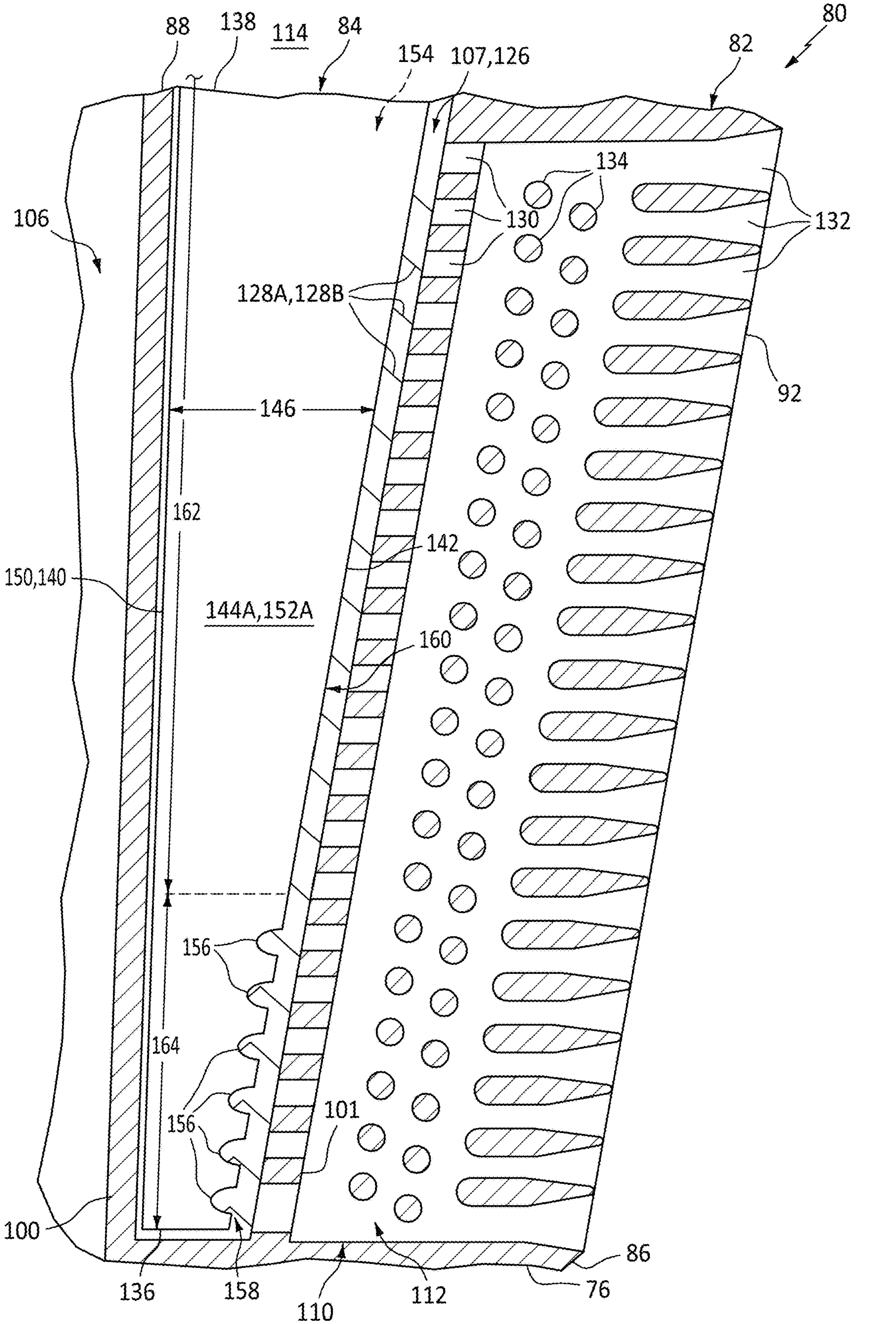
FIG. 7 is a partial cutaway illustration of the turbine vane at the vane baffle.
Figure 8:
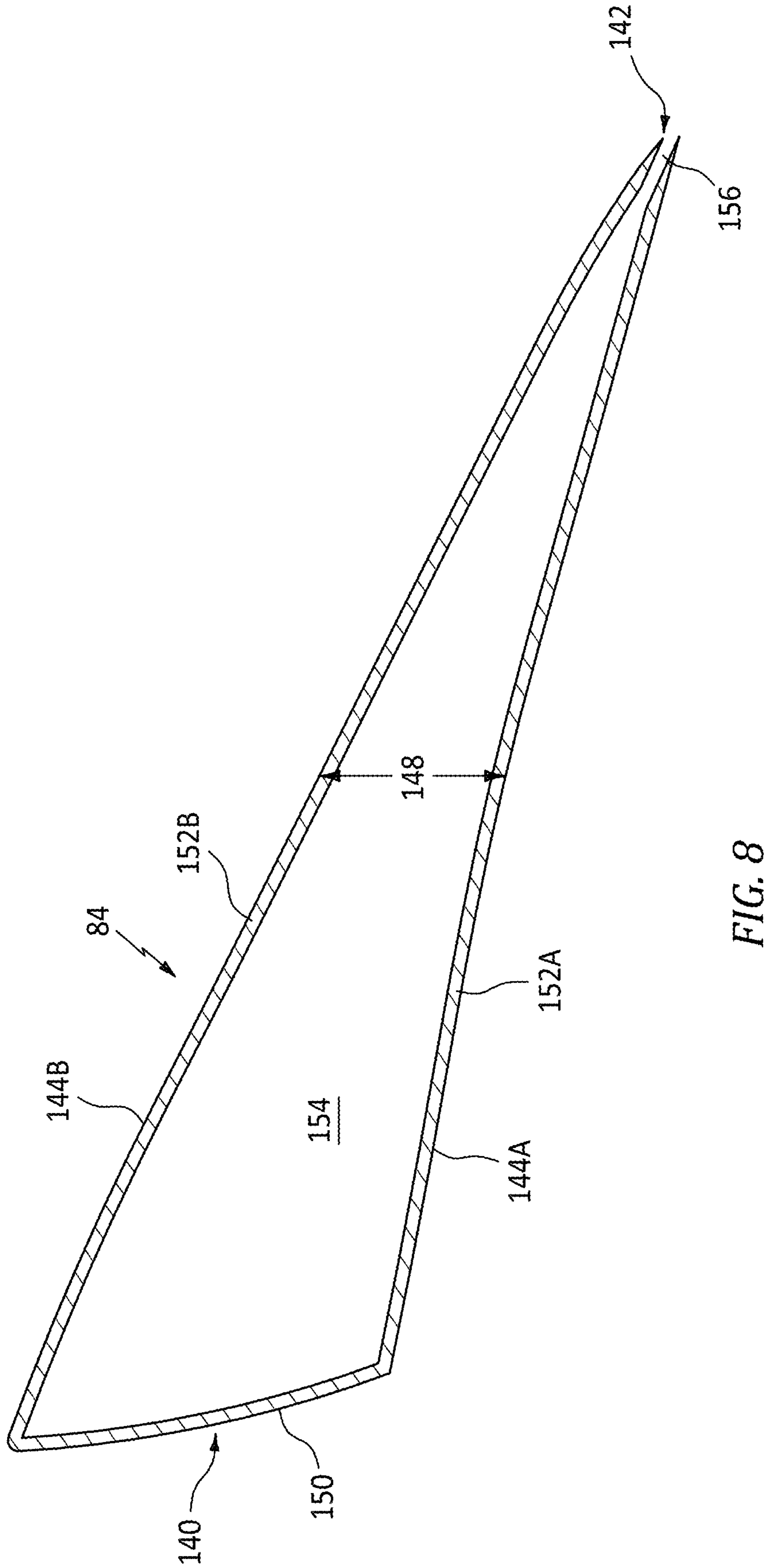
FIG. 8 is a sectional illustration of the vane baffle.

Referring to FIG. 7, the vane baffle 84 is disposed (e.g., partially or completely) within the trailing edge feed cavity 107. The vane baffle 84 extends spanwise (e.g., radially relative to the axis) from a radial inner, base end 136 of the vane baffle 84 to a radial outer, tip end 138 of the vane baffle 84. The baffle base end 136 of FIG. 7 is disposed at (or near) the airfoil base end 86. The baffle tip end 138 of FIG. 7 is disposed at (or near) the airfoil tip end 88. The vane baffle 84 extends longitudinally (e.g., generally axially along the axis) from an upstream end 140 of the vane baffle 84 to a trailing edge 142 of the vane baffle 84, where the baffle end 140 is upstream of the baffle trailing edge 142 along the core flowpath 58. Referring to FIG. 8, the vane baffle 84 extends laterally (e.g., generally circumferentially about the axis, or tangentially) between and to opposing lateral sides 144A and 144B (generally referred to as "144") of the vane baffle 84. The baffle first side 144A of FIG. 5 is laterally next to the airfoil first sidewall 96A with a first portion of the trailing edge feed passage 126 formed by and laterally between the baffle first side 144A and the airfoil first sidewall 96A. The baffle second side 144B of FIG. 5 is laterally next to the airfoil second sidewall 96B with a second portion of the trailing edge feed passage 126 formed by and laterally between the baffle second side 144B and the airfoil second sidewall 96B. Referring to FIG. 8, the opposing baffle sides 144 project longitudinally out from the baffle end 140 to and meet at the baffle trailing edge 142. Referring to FIGS. 7 and 8, each of the baffle members 140, 142, 144A, 144B extends spanwise from the baffle base end 136 to the baffle tip end 138.

The vane baffle 84 of FIG. 7 has a longitudinal width 146 extending from the baffle end 140 to the baffle trailing edge 142. This longitudinal width 146 may (e.g., continuously and/or uniformly) decrease as the vane baffle 84 extends spanwise from (or about) the baffle tip end 138 to (or about) the baffle base end 136. Referring to FIG. 8, the vane baffle 84 has a lateral width 148 extending between the opposing baffle sides 144. This lateral width 148 may (e.g., continuously and/or uniformly) decrease as the vane baffle 84 extends longitudinally from (or about) the baffle end 140 to (or about) the baffle trailing edge 142.

The vane baffle 84 includes an upstream endwall 150, a first (e.g., pressure side) sidewall 152A and a second (e.g., suction side) sidewall 152B. The vane baffle 84 also includes an interior passage 154 and one or more notches 156.

The baffle endwall 150 forms the baffle end 140, and extends laterally between and to the baffle first sidewall 152A and the baffle second sidewall 152B. The baffle first sidewall 152A forms the baffle first side 144A. The baffle second sidewall 152B forms the baffle second side 144B. These baffle sidewalls 152 project longitudinally out from the baffle endwall 150 to and meet at the baffle trailing edge 142. The baffle members 150, 152A and 152B may be formed integral with one another. The vane baffle 84, for example, may be formed from a cut and shaped piece of sheet material; e.g., sheet metal.

The baffle passage 154 extends longitudinally within the vane baffle 84 from the baffle endwall 150 to a downstream intersection between the opposing baffle sidewalls 152 at the baffle trailing edge 142. The baffle passage 154 extends laterally within the vane baffle 84 between the opposing baffle sidewalls 152. Referring to FIG. 7, the baffle passage 154 extends spanwise through the vane baffle 84 from the baffle tip end 138 to the baffle base end 136. However, in other embodiments, it is contemplated the baffle passage 154 may alternatively extend spanwise partially into the vane baffle 84 from the baffle tip end 138 towards the baffle base end 136. This baffle passage 154 forms an inner passage on an interior of the vane baffle 84, whereas the trailing edge feed passage 126 forms an outer passage to an exterior of the vane baffle 84. Both of these passages 126 and 154 may be (e.g., independently) fluidly coupled to the outer plenum 114 at the baffle tip end 138.

The notches 156 are disposed in the baffle trailing edge 142 at or about the baffle base end 136. The notches 156 of FIG. 7, for example, are arranged and may be equispaced spanwise along the baffle trailing edge 142. These notches 156 may be clustered in and form an inner perforated portion 158 of the baffle trailing edge 142. The perforated portion 158 of the baffle trailing edge 142 is disposed spanwise next to the baffle base end 136. The perforated portion 158 of the baffle trailing edge 142 is spaced from the baffle tip end 138 by an outer unperforated portion 160 of the baffle trailing edge 142. The unperforated portion 160 of the baffle trailing edge 142 of FIG. 7 extends spanwise from the baffle tip end 138 to the perforated portion 158 of the baffle trailing edge 142. Here, the unperforated portion 160 of the baffle trailing edge 142 may have a spanwise length 162 which is equal to or greater than a spanwise length 164 of the perforated portion 158 of the baffle trailing edge 142. The spanwise length 162 of the unperforated portion 160 of the baffle trailing edge 142 of FIG. 7 is equal to or greater than one-half (½), two-third (⅔) or three-quarters (¾) of a spanwise length (e.g., 162+164) of the entire baffle trailing edge 142.

Each of the notches 156 projects through one or more of the baffle sidewalls 152 from the baffle passage 154 to the trailing edge feed passage 126. The notches 156 thereby fluidly couple the baffle passage 154 to the trailing edge feed passage 126 along the perforated portion 158 of the baffle trailing edge 142. The baffle passage 154, however, may otherwise be fluidly separated from the trailing edge feed passage 126 by a (e.g., unperforated) remainder of the vane baffle 84. The unperforated portion 160 of the baffle trailing edge 142, for example, fluidly separates the baffle passage 154 from the trailing edge feed passage 126. Similarly, each of the baffle sidewalls 152 of FIG. 5 fluidly separates the baffle passage 154 from the trailing edge feed passage 126 outside of the perforated portion 158 of the baffle trailing edge 142.

Figure 11:
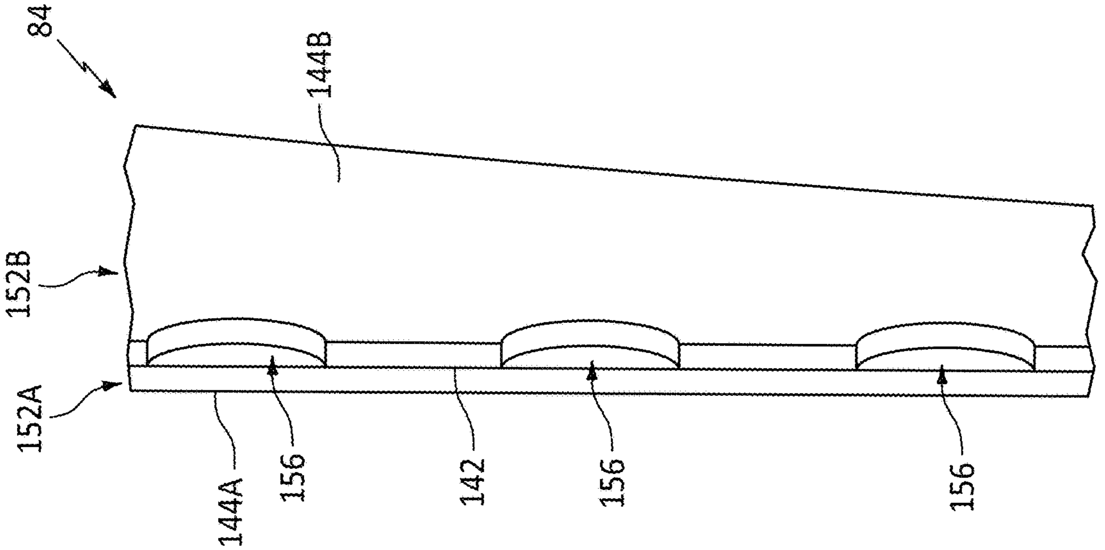
FIGS. 9-11 are partial perspective illustrations of the vane baffle along a perforated portion of a trailing edge of the vane baffle.
Figure 10:
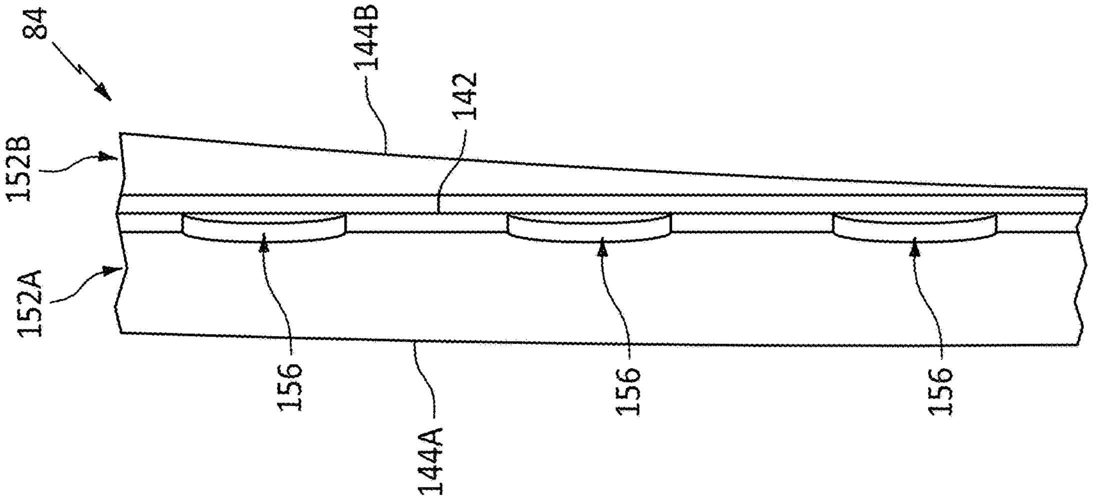
Figure 9:
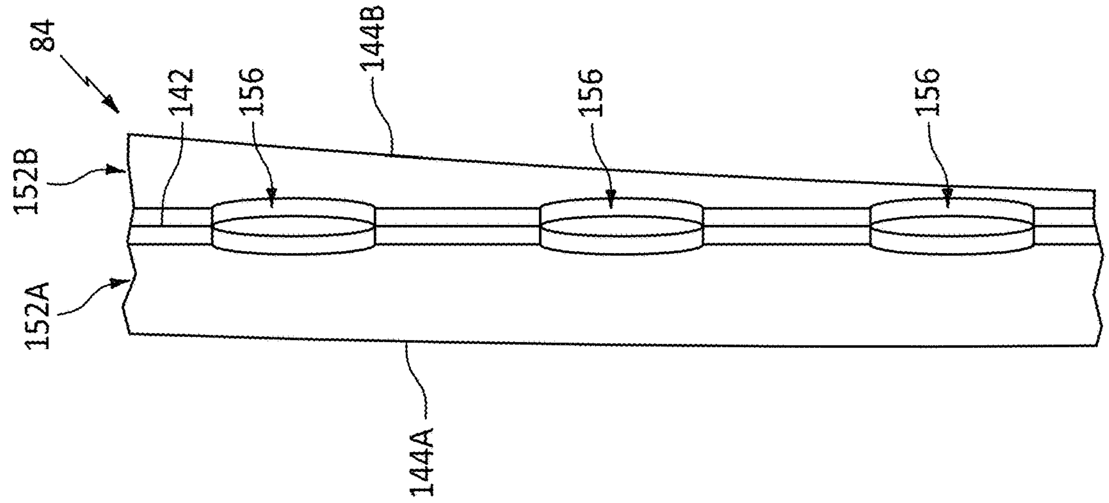

Referring to FIG. 7, each notch 156 extends longitudinally into the respective baffle sidewall 152. Referring to FIG. 9, each notch 156 extends spanwise within the respective baffle sidewall 152. Each notch 156 extends laterally through the respective sidewall 152. While the notches 156 of FIG. 9 are shown as being formed in each of the baffle sidewalls 152A and 152B at the baffle trailing edge 142, the present disclosure is not limited to such an exemplary arrangement. For example, referring to FIGS. 10 and 11, each notch 156 may alternatively be formed in a single one of the baffle sidewalls 152A, 152B. Each notch 156 of FIG. 10, for example, is formed solely in the baffle first sidewall 152A, where the baffle second sidewall 152B spanwise and longitudinally covers a side of the respective notch 156. Each notch 156 of FIG. 11, by contrast, is formed solely in the baffle second sidewall 152B, where the baffle first sidewall 152A spanwise and longitudinally covers a side of the respective notch 156. With the arrangements of FIGS. 10 and 11, the notches 156 are configured to influence mixing of air within the trailing edge feed passage 126 as well as facilitate increased longitudinal diffusion of air injected into the trailing edge feed passage 126 from the baffle passage 154 (see FIG. 5).

Referring to FIG. 4, during turbine engine operation, the combustion products flowing through the core flowpath 58 subject each turbine vane 80 to relatively high temperatures. The vane airfoil 82 of each turbine vane 80 may be air cooled by directing cooling air (e.g., core air bled from the compressor section 27 of FIG. 1) through the outer plenum 114 into the interior volumes 104-107. However, as the cooling air flows radially inward within the vane airfoil 82, the relatively hot airfoil sidewalls 96 (see FIG. 5) may heat up the cooling air. Thus, referring to FIG. 7, the cooling air flowing within the trailing edge feed passage 126 (e.g., if the notches 156 in the vane baffle 84 were omitted) towards the airfoil base end 86 may be significantly warmer than the cooling air initially entering the trailing edge feed passage 126 at the airfoil tip end 88. However, by directing some of the cooling air into the baffle passage 154 and then directing this cooling air into the trailing edge feed passage 126 at (or near) the airfoil base end 86, relatively cold cooling air may be delivered to the trailing edge feed passage 126 at this airfoil base end 86. The trailing edge cooling circuit 110 may thereby receive relatively cold cooling air along (e.g., an entirety) of the trailing edge interior wall 101 through its circuit inlets 130. The notched vane baffle 84 of the present disclosure may thereby facilitate tuned cooling for the turbine vane 80.

Figure 12A:
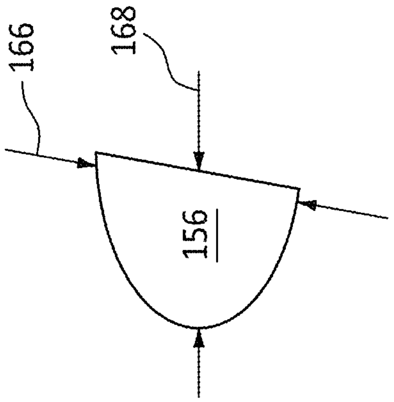
FIGS. 12A-H are schematic illustrations of a baffle notch with various geometries.
Figure 12B:
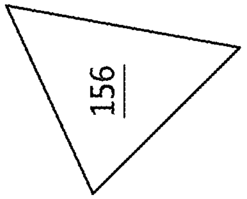
Figure 12C:
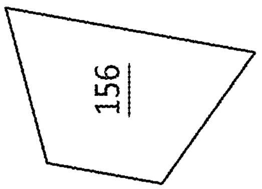
Figure 12D:
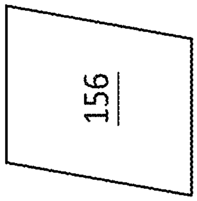
Figure 12E:
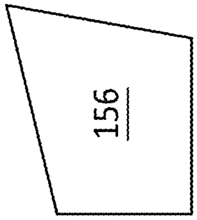
Figure 12F:
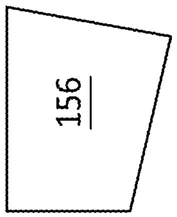
Figure 12H:
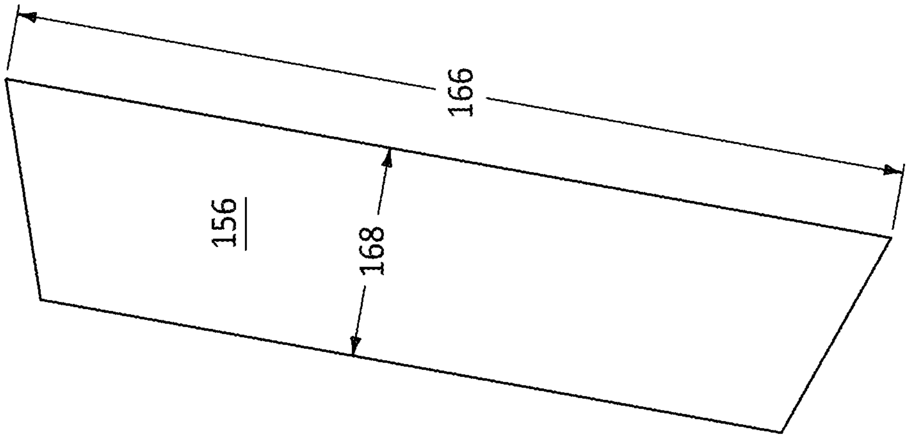
Figure 12G:
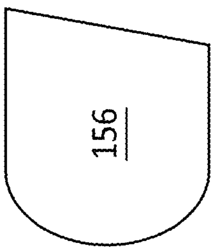

Referring to FIGS. 12A-H, each notch 156 has a cross-sectional geometry when viewed in a reference plane, for example, parallel to a respective one of the baffle sidewalls 152 (see FIG. 8) at the baffle trailing edge 142. Referring to FIGS. 12A and 12G, the notch geometry may be semi-circular, arcuate, oval or otherwise curved. Referring to FIGS. 12B-F and 12H, the notch geometry may alternatively be triangular, isosceles trapezoidal, non-isosceles trapezoidal, rectangular or otherwise polygonal. In some embodiments, referring to FIG. 12A (see also FIGS. 12B-G), a ratio between a spanwise length 166 of each notch 156 to a longitudinal depth 168 of that respective notch 156 may be equal to or less than one and one-half to one (1.5 to 1). Each notch 156, for example, may be configured as a point aperture. In other embodiments, referring to FIG. 12H, the ratio between the spanwise length 166 of each notch 156 to the longitudinal depth 168 of that respective notch 156 may be equal to or greater than one and one-half to one (1.5 to 1), two to one (2 to 1), four to one (4 to 1), or more. Each notch 156, for example, may be configured as an elongated slot. Moreover, multiple point aperture notches may be replaced by a single elongated slot notch, or fewer elongated slot notches.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for a turbine engine, comprising:

an airfoil extending spanwise from an airfoil base end to an airfoil tip end, the airfoil extending longitudinally from an airfoil leading edge to an airfoil trailing edge, the airfoil extending laterally between an airfoil first side and an airfoil second side with the airfoil second side meeting the airfoil first side at the airfoil leading edge and the airfoil trailing edge, and a cavity projecting spanwise into the airfoil from the airfoil tip end towards the airfoil base end; and a baffle disposed in the cavity with an outer passage formed between the baffle and a wall of the airfoil, the baffle extending spanwise from a baffle base end disposed at the airfoil base end to a baffle tip end disposed at the airfoil tip end, the baffle extending longitudinally from a baffle end to a baffle trailing edge, the baffle extending laterally between a baffle first side and a baffle second side with the baffle second side meeting the baffle first side at the baffle trailing edge, an inner passage projecting spanwise into the baffle from the baffle tip end towards the baffle base end, a notch disposed in the baffle trailing edge at the baffle base end, and the notch fluidly coupling the inner passage to the outer passage;

wherein the baffle trailing edge includes a perforated portion and an unperforated portion spanwise between the baffle tip end and the perforated portion, the notch is disposed spanwise along the perforated portion, and a spanwise length of the unperforated portion is equal to or greater than one-half of a spanwise length of the baffle trailing edge from the baffle base end to the baffle tip end.

2. The assembly of claim 1, wherein the notch has a spanwise length and a longitudinal depth; and a ratio between the spanwise length and the longitudinal depth is equal to or less than 1.5 to 1.

3. The assembly of claim 1, wherein the notch has a spanwise length and a longitudinal depth; and a ratio between the spanwise length and the longitudinal depth is greater than 1.5 to 1.

4. The assembly of claim 1, wherein the baffle includes a baffle first sidewall and a baffle second sidewall that meets the baffle first sidewall at the baffle trailing edge;

the baffle first sidewall forms the baffle first side;

the baffle second sidewall forms the baffle second side; and the notch extends laterally through and longitudinally into the baffle first sidewall.

5. The assembly of claim 4, wherein the notch further extends laterally through and longitudinally into the baffle second sidewall.

6. The assembly of claim 4, wherein a portion of the baffle second sidewall spanwise and longitudinally overlaps the notch.

7. The assembly of claim 4, wherein the airfoil first side is a pressure side of the airfoil, and the baffle first side is disposed laterally between the baffle second side and the airfoil first side; and the airfoil second side is a suction side of the airfoil, and the baffle second side is disposed laterally between the baffle first side and the airfoil second side.

8. The assembly of claim 4, wherein the airfoil first side is a suction side of the airfoil, and the baffle first side is disposed laterally between the baffle second side and the airfoil first side; and the airfoil second side is a pressure side of the airfoil, and the baffle second side is disposed laterally between the baffle first side and the airfoil second side.

9. The assembly of claim 1, wherein the notch is one of a plurality of notches disposed in the baffle trailing edge.

10. The assembly of claim 9, wherein the plurality of notches provide a sole fluid coupling between the inner passage and the outer passage along the baffle.

11. The assembly of claim 1, wherein the outer passage extends spanwise along the baffle trailing edge, the baffle first side and the baffle second side from the baffle tip end to the baffle base end.

12. The assembly of claim 1, wherein the airfoil includes a trailing edge cooling circuit with a plurality of inlets and a plurality of outlets;

the plurality of inlets project through the wall of the airfoil and are fluidly coupled to the outer passage; and the plurality of outlets are disposed spanwise along the airfoil trailing edge and are fluidly coupled to an environment outside of the airfoil.

13. The assembly of claim 12, wherein the trailing edge cooling circuit further includes a circuit cavity longitudinally between and fluidly coupled to the plurality of inlets and the plurality of outlets.

14. The assembly of claim 13, wherein a plurality of protrusions project laterally across the circuit cavity between a first sidewall of the airfoil and a second sidewall of the airfoil;

the first sidewall of the airfoil forms the airfoil first side; and the second sidewall of the airfoil forms the airfoil second side.

15. The assembly of claim 1, wherein the wall of the airfoil is a sidewall of the airfoil forming the airfoil first side or the airfoil second side; and the airfoil includes one or more protrusions projecting laterally into the outer passage from the sidewall of the airfoil towards the baffle, and each of the one or more protrusions is laterally spaced from the baffle.

16. The assembly of claim 1, further comprising a turbine vane structure including the airfoil and the baffle.

17. The assembly of claim 1, further comprising:

an inner platform extending circumferentially around a centerline;

an outer platform extending circumferentially around the centerline; and a plurality of vanes arranged circumferentially around the centerline in an array, each of the plurality of vanes extending spanwise from the inner platform to the outer platform, and a first of the plurality of vanes comprising the airfoil.

18. An assembly for a turbine engine, comprising:

an airfoil extending spanwise from an airfoil inner end to an airfoil outer end, the airfoil extending longitudinally from an airfoil leading edge to an airfoil trailing edge, the airfoil extending laterally between an airfoil first side and an airfoil second side with the airfoil second side meeting the airfoil first side at the airfoil leading edge and the airfoil trailing edge, and a cavity projecting spanwise into the airfoil from the airfoil outer end towards the airfoil inner end; and a baffle disposed in the cavity with an outer passage formed between the baffle and a wall of the airfoil, the baffle extending spanwise from a baffle outer end to a baffle inner end, the baffle extending longitudinally from a baffle end to a baffle trailing edge, the baffle extending laterally between a baffle first side and a baffle second side with the baffle second side meeting the baffle first side at the baffle trailing edge, an inner passage projecting spanwise into the baffle from the baffle outer end towards the baffle inner end, one or more notches formed along the baffle trailing edge, and the one or more notches fluidly coupling the inner passage to the outer passage;

wherein an outer portion of the baffle trailing edge spanwise between the one or more notches and the baffle outer end fluidly decouples the inner passage from the outer passage, and a spanwise length of the outer portion of the baffle trailing edge is equal to or greater than one-half of a spanwise length of the baffle trailing edge from the baffle inner end to the baffle outer end.

19. An apparatus for a turbine vane in a turbine engine, comprising:

a baffle comprising sheet metal and a plurality of notches, the sheet metal forming the baffle with an endwall, a first sidewall, a second sidewall and an internal passage;

the endwall, the first sidewall and the second sidewall each extending spanwise from an inner end of the baffle to an outer end of the baffle;

the endwall extending laterally between the first sidewall and the second sidewall;

the first sidewall and the second sidewall projecting longitudinally out from the endwall and meeting at a trailing edge of the baffle;

the internal passage extending spanwise through the baffle, the internal passage extending longitudinally within the baffle from the endwall to an intersection between the first sidewall and the second sidewall at the trailing edge of the baffle, and the internal passage extending laterally within the baffle from the first sidewall to the second sidewall; and the plurality of notches disposed in and arranged spanwise along the trailing edge of the baffle, each of the plurality of notches projecting laterally through and longitudinally into at least one of the first sidewall and the second sidewall;

wherein an outer portion of the trailing edge of the baffle spanwise between the plurality of notches and the outer end of the baffle is unperforated, and a spanwise length of the outer portion of the trailing edge of the baffle is equal to or greater than one-half of a spanwise length of the trailing edge of the baffle from the inner end of the baffle to the outer end of the baffle.

* * * * *